(12) United States Patent  
Diederiks

(10) Patent No.: US 9,695,634 B2  
(45) Date of Patent: Jul. 4, 2017

(54) AUTO-CALIBRATION OF BLINDS SYSTEMS IN BUILDINGS

(71) Applicant: PHILIPS LIGHTING HOLDING B.V., Eindhoven (NL)

(72) Inventor: Elmo Marcus Attila Diederiks, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 153 days.

(21) Appl. No.: 14/362,823

(22) PCT Filed: Nov. 23, 2012

(86) PCT No.: PCT/IB2012/056647  
§ 371 (c)(1),  
(2) Date: Jun. 4, 2014

(87) PCT Pub. No.: WO2013/084102  
PCT Pub. Date: Jun. 13, 2013

(65) Prior Publication Data  
US 2014/0338844 A1 Nov. 20, 2014

Related U.S. Application Data

(60) Provisional application No. 61/567,736, filed on Dec. 7, 2011.

(51) Int. Cl.  
*E06B 9/68* (2006.01)  
*E06B 9/32* (2006.01)

(52) U.S. Cl.  
CPC ........ *E06B 9/68* (2013.01); *E06B 9/32* (2013.01); *E06B 2009/6809* (2013.01); *E06B 2009/6827* (2013.01); *Y02B 80/50* (2013.01)

(58) Field of Classification Search  
CPC ...... E06B 9/68; E06B 2009/6809; E06B 9/32; E06B 2009/6827; E06B 2009/6818; Y02B 80/50  
See application file for complete search history.

(56) References Cited

U.S. PATENT DOCUMENTS 6,965,813 B2 * 11/2005 Granqvist .......... G05D 23/1924  
                                                    700/276  
7,111,952 B2 * 9/2006 Veskovic .................. E06B 9/32  
                                                      160/5

(Continued)

FOREIGN PATENT DOCUMENTS

CN        101449018 A    6/2009  
EP         2199528 A3    6/2010

(Continued)

OTHER PUBLICATIONS

Matta, Sherif et al "An Intelligent Light Control System for Power Saving", IEEE 2010, pp. 3316-3321.

*Primary Examiner* — Blair M Johnson

(57) ABSTRACT

The present invention relates to a control system for automatic calibration of a blinds system installed in a room, comprising: a controller (1, 8, 9) having a memory, a clock and a processor, an occupancy sensor (2, 7), an interior light sensor (3, 7), an exterior light sensor (4). The control system is characterized in that the control system is arranged to run an automated calibration of the blinds system when the exterior light sensor indicates an outside light level above a predetermined threshold, the occupancy sensor indicates that no person is present in the room, and a predetermined time has passed since the last calibration. The invention further relates to a method for automatic calibration of a blinds system installed in a room using a control system comprising a controller (1, 8, 9) having a memory, a clock and a processor, an occupancy sensor (2, 7), an interior light (Continued)

sensor (3, 7), an exterior light sensor (4), the method comprising the step of: running an automated calibration of the blinds system when the exterior light sensor (4) indicates an outside light level above a predetermined threshold, the occupancy sensor (2, 7) indicates that no person is present in the room, and a predetermined time has passed since the last calibration.

15 Claims, 5 Drawing Sheets

(56) References Cited

U.S. PATENT DOCUMENTS

| | | | |
|---|---|---|---|
| 7,940,167 B2 * | 5/2011 | Steiner | G08B 29/24 |
| | | | 206/703 |
| 8,199,010 B2 * | 6/2012 | Sloan | H05B 37/0227 |
| | | | 340/540 |
| 2005/0110416 A1 | 5/2005 | Veskovic | |
| 2006/0207730 A1 | 9/2006 | Berman et al. | |
| 2009/0254222 A1 * | 10/2009 | Berman | E06B 9/322 |
| | | | 700/275 |
| 2010/0006241 A1 | 1/2010 | Veskovic | |
| 2011/0029136 A1 | 2/2011 | Altonen et al. | |
| 2011/0240232 A1 * | 10/2011 | Kluck | A47H 5/0325 |
| | | | 160/5 |
| 2012/0073765 A1 * | 3/2012 | Hontz | E06B 9/304 |
| | | | 160/84.02 |

FOREIGN PATENT DOCUMENTS

| | | |
|---|---|---|
| GB | 2462753 A | 2/2010 |
| JP | 0317382 A | 1/1991 |
| JP | 2007120088 A | 5/2007 |

* cited by examiner

AUTO-CALIBRATION OF BLINDS SYSTEMS IN BUILDINGS

CROSS-REFERENCE TO PRIOR APPLICATIONS

This application is the U.S. National Phase application under 35 U.S.C. §371 of International Application No. PCT/IB2012/056647, filed on Nov. 23, 2012, which claims the benefit of U.S. Provisional Patent Application No. 61/567,736, filed on Dec. 7, 2011. These applications are hereby incorporated by reference herein.

FIELD OF THE INVENTION

The present invention relates generally to auto-calibration of blinds systems in buildings. More particularly, the present invention relates to a control system for automatic calibration of a blinds system installed in a room as defined in the introductory parts of claim 1. The invention further also relates to a method for automatic calibration of a blinds system installed in a room.

BACKGROUND OF THE INVENTION

Commercial buildings account for about 30% to 40% of the world's energy consumption. It is therefore important to reduce the energy consumption of these buildings. On average, lighting accounts for 40% and heating, ventilation, and air conditioning (HVAC) accounts for 30% of the total building energy use. The remaining 30% is used for appliances, elevators etcetera. It is clear that lighting and HVAC are the main candidates for improvement and the easiest to address.

The three main areas in managing lighting and HVAC are to manage interior lighting, exterior lighting and sun heat gain and to manage the building HVAC system. Each of these systems can be optimized within themselves, already leading to considerable energy reduction. In order to further reduce the energy consumption of commercial buildings, these systems require integration.

However due to business models and building construction processes, these systems have not been integrated in a sophisticated manner. There is thus a need to improve the lighting and HVAC systems of commercial buildings to reduce their energy consumption.

Blinds systems are one type of systems incorporated in commercial buildings for control of sunlight in buildings, affecting both lighting and air conditioning systems. Blinds systems have many mechanical parts that are subject to wear. At the same time it is essential to be able to control the blinds precisely so as to realize maximum comfort and use of daylight, while minimizing glare and uncomfortable contrast levels. An example of the control of a blinds system is shown in the patent publication US-2010/0006241. In US-2010/0006241 a control system controls blinds and lighting in a room dependent on the sun, to utilize the sun light but reduce glare when the sun is strong.

Controlling blinds systems for commercial buildings automatically works quite well, but after a period of use the blinds cannot be properly controlled due to wear in the mechanical parts, e.g. due to stretching of the wires and increasing slag on rotating axes. When a blinds system has been worn, it normally has to be recalibrated, which would normally be done by technical service personnel for the blinds systems or other maintenance personnel, if done at all. Such recalibration is time consuming and expensive and is therefore not done as often as would be desired for optimal performance. The result is that blinds systems often are badly calibrated for relatively long periods of times.

SUMMARY OF THE INVENTION

It is an object of the present invention to improve the current state of the art, to solve the above problems, and to provide an improved device for automatic calibration of blinds systems in buildings. These and other objects are achieved by a control system for automatic calibration of a blinds system installed in a room, comprising: a controller having a memory and a processor, an occupancy sensor, an interior light sensor, an exterior light sensor, a clock, characterised in that said control system is arranged to run an automated calibration of said blinds system when said exterior light sensor indicates an outside light level above a predetermined threshold, said occupancy sensor indicates that no person is present in said room, and a predetermined time has passed since the last calibration.

This enables the blinds system to recalibrate and adjust its control positions to compensate for wear of the hardware components and assure maximum comfort and energy saving over longer periods of time. Since the calibration is automatically made after some time when no person is present in said room, and a predetermined time has passed since the last calibration, expensive manual recalibration of the system is avoided.

The control system further advantageously comprises an artificial lighting detector for determining if artificial lighting is on in said room. The control system is arranged to run a calibration of said blinds system when said artificial lighting detector indicates that artificial lighting is off.

The control system will compare the outside light levels with the interior light level to determine if a recalibration of a certain blinds position is necessary. It is thus essential that the interior artificial lighting is turned off when performing the calibration. The artificial light detector is either a detector only connected to the blinds control system or it is a detector comprised in the lighting system. If the lighting system is controlled by the same occupancy sensor as the blinds system control system is, and the light is always automatically turned off when no presence is detected in the room, it is not necessary to have a special sensor for artificial light. Alternatively, the system may turn the lights off before the calibration, which should be fine in most cases, since no one is present in the room according to the occupancy sensor.

According to one embodiment of the invention the blinds system comprises slats, a first step motor arranged to drive extension movements of said blinds and a second step motor arranged to drive rotational movement of said slats, wherein said memory has a number of stored positions of said first and second step motors and wherein the corresponding light level ratio between interior and exterior light is stored for each of said stored positions and wherein said stored step motor positions are arranged to be updated to meet said light level ratio during said automatic calibration.

The motors are preferably step motors, since they are easy to track with regard to their rotational position. The step motors could, however, be replaced by any suitable motor for driving shades having the feature that it can be tracked easily with regard to its rotational position.

The positions that are stored may be any and may be as many as the memory can hold, which likely is much more than desired if the memory is big. Some special positions are, however, more important than others, which will be further discussed below.

The blinds system may be either vertical or horizontal, i.e. the extension can be either vertical or horizontal. In another embodiment, the control system may be arranged to control and automatically calibrate shades, where a curtain of some material is extended either horizontally or vertically e.g. from a roll. In the case of a shade, only the first step motor is needed.

The control system is preferably further comprising network communications means to be able to communicate with other computerized systems in the building it is installed in. Commercial buildings, but also other kinds of buildings, often have a building management system (BMS), a light controller or other computerized means for controlling functions in the building. This enables a simple way to utilize data measured by existing sensors, e.g. interior, and perhaps also exterior, light sensors, occupancy sensors etc. The control system according to the invention may also, according to one embodiment, be incorporated into the BMS as a program if the BMS has access to all hardware necessary according to the above description. The occupancy sensor and/or interior light sensor may thus be part of a lighting system in a room having said control system for auto-calibration of blinds systems installed, said network communication means being arranged to communicate with said occupancy sensor and/or interior light sensor.

The system according to the invention is thus intended to be installed in a building. The system is especially advantageous in commercial or public buildings where lighting often demands a lot of energy, and the system will come to use the best. All kinds of automatic blinds and shade systems subjected to mechanical wear may however be helped by the automatic calibration in the control system of the present invention.

The invention further relates to a method for automatic calibration of a blinds system installed in a room using a control system comprising a controller having a memory and a processor, an occupancy sensor, an interior light sensor, an exterior light sensor, a clock, said method comprising the step of: running an automated calibration of said blinds system when said exterior light sensor indicates an outside light level above a predetermined threshold, said occupancy sensor indicates that no person is present in said room, and a predetermined time has passed since the last calibration.

The method may further advantageously utilize a control system that further comprises an artificial lighting detector for determining if artificial lighting is on in said room, said method further comprising the step of: running said calibration of said blinds system when said artificial lighting detector indicates that artificial lighting is off.

The method may further utilize a blinds system comprising slats, a first step motor arranged to drive extension movements of said blinds and a second step motor arranged to drive rotational movement of said slats, wherein said memory has a number of stored positions of said first and second step motors and wherein the corresponding light level ratio between interior and exterior light is stored for each of said stored positions and wherein said method further comprises the step of updating said stored step motor positions to meet said light level ratio during said automatic calibration.

The method may further comprise that the step of updating said stored step motor positions comprises the steps of: controlling said first and second step motor to a stored position for the blinds with regard to blinds extension and slat angles, measuring a new light level ratio between interior and exterior light, comparing said new light level ratio to the stored light level ratio for the current position, if the new light level ratio is other than the stored light level ratio, the second step motor is incrementally adjusted while measuring the light level ratio to find the predetermined light level ratio, which measured light level ratio is updated in the memory together with said step motor positions for the blinds position.

This method is used to calibrate the rotational positions of the slats in the blinds system. This is useful for all positions as long as the extension is correctly calibrated. Rotational movement of the slats is normally only performed when the blinds are fully extended. Calibration of the extension of the blinds is thus preferably done before calibrating the slat positions.

As mentioned before, some positions of the first and second step motors are more important to calibrate than others. A number of such important stored positions of said first and second step motors correspond to at least one of the following combinations for light level ratios R (where angles are angles compared to the vertical outside facing pane):

$R_1$) the blinds are fully extended with the slats at 45 degrees;

$R_2$) the blinds are fully extended with the slats fully open or at 90 degrees;

$R_3$) the blinds are fully extended with the slats at 135 degrees;

$R_4$) the blinds are fully extended with the slats fully closed or at 180 degrees;

$R_{min}$) the blinds are fully extended with the slats fully closed or at 0 degrees; or $R_{max}$) the blinds are not extended, the slats are fully open or at 90 degrees.

The step of updating said stored step motor positions in the method for automatic calibration of a blinds system may further comprise the steps of: controlling said first and second step motor to the stored position for light level ratio $R_2$, measuring the light level ratio $R'_2$, controlling said first and second step motor to the stored position for light level ratio $R_4$, measuring the light level ratio $R'_4$, controlling said first and second step motor to the stored position for light level ratio $R_{min}$, measuring said light level ratio $R'_{min}$, comparing said measured light level ratio $R'_{min}$ to the stored light level ratio $R_{min}$ for the current position, and if the measured light level ratio $R_{min}'$ is higher than the stored light level ratio $R_{min}$, $R'_4$ is higher than $R_4$, and $R'_2$ is higher than $R_2$, the first step motor is incrementally adjusted to further extend said blinds until $R_{min}$ is equal or lower than said stored value, if the measured light level ratio $R'_{min}$ is higher than the stored light level ratio $R_{min}$, and $R'_4$ and $R'_2$ both are as the stored values $R_4$ and $R_2$ respectively, the second step motor is incrementally adjusted to further close the slats while measuring the light level ratio until the light level ratio is equal or lower than said stored value, update the last measured light level ratio is in the memory together with said step motor positions for the fully extended and fully closed position.

The step of updating said stored step motor positions in the method for automatic calibration of a blinds system may further comprise the steps of: controlling said first and second step motor to the stored position for light level ratio $R_2$ measuring a new light level ratio $R'_2$ between interior and exterior light, comparing said new light level ratio $R'_2$ to the stored light level ratio for the current position, if the new light level ratio $R'_2$ is lower than the stored light level ratio $R_2$, the second step motor is incrementally adjusted while measuring the light level ratio to find the maximum light level ratio, which light level ratio $R_2$ is updated in the memory together with said step motor positions for the fully extended and fully opened position.

Apart from calibration of the important positions, fully extended and fully closed, or light level ratios $R_{min}$, and $R_4$, have been made, also the not extended, that is no blinds, position should be measured, preferably before other calibration. If the measured light level ratio, $R'_{max}$, is lower than the stored value of $R_{max}$, the blinds are not fully recessed and the first step motor pulls the blinds a small incremental step further in. The procedure is repeated until the $R'_{max}$ is equal to or higher than $R_{max}$.

It should be noted that the inventive method may incorporate any of the features described above in association with the inventive system and has the same corresponding advantages.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF THE EMBODIMENTS

Figure 1A:
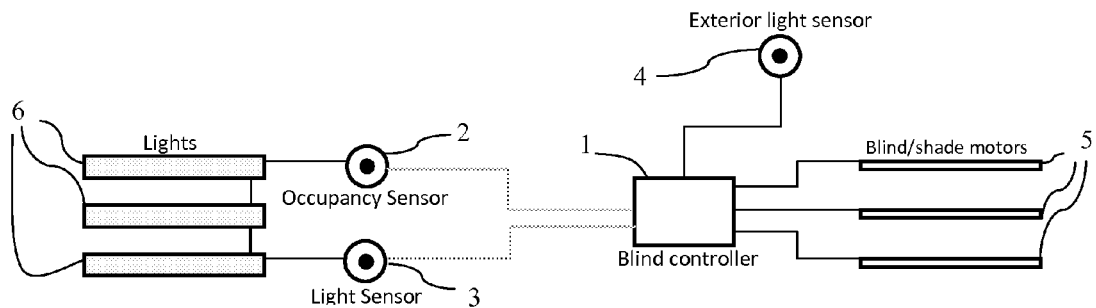
FIGS. 1a to 1c show the control system for automatic calibration of a blinds system, with different configurations of light and occupancy sensors.
Figure 1B:
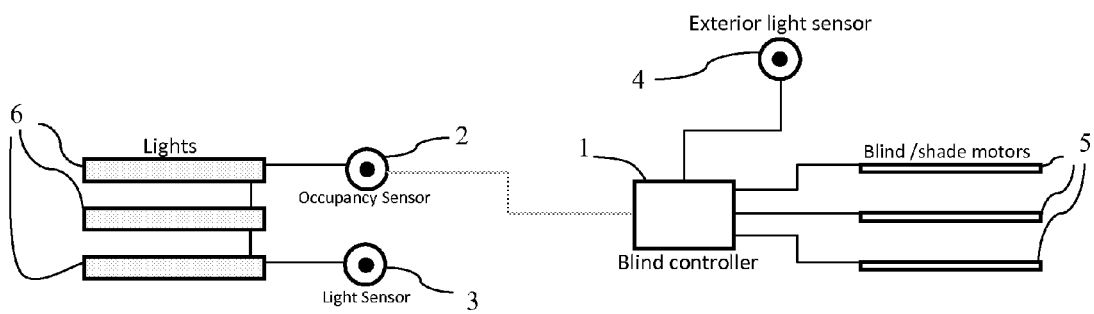
Figure 1C:
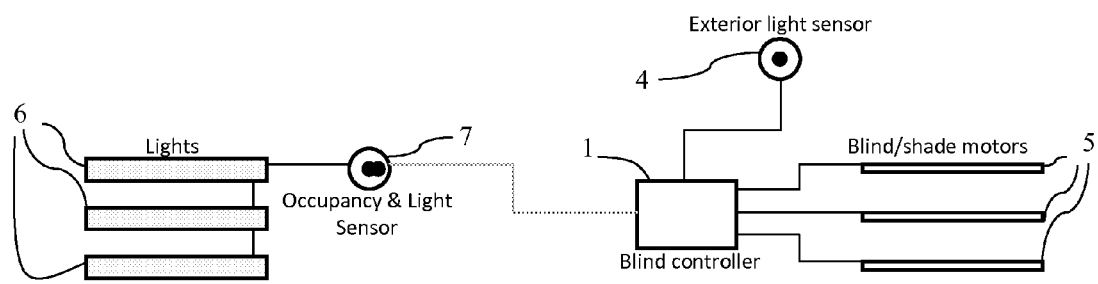

The occupancy sensor 2 and lighting sensor 3 information is integrated with the blinds control system. The occupancy and lighting sensors can have a direct link to the blinds system as shown in FIG. 1a. Alternatively, only the occupancy 2 or light sensor 3 can be connected to the blinds system, porting the communication between the other sensor and the blinds system controller 1 and managing communication between itself and the blinds system, as shown in FIG. 1b. A third, and most easy, option is to use an integrated occupancy and lighting sensor 7 and connect it directly to the blinds system, as shown in FIG. 1c. All these three solutions require a specific connector on the sensors 2, 3, 7 and the blinds control system and an agreed communication protocol.

Figure 2A:
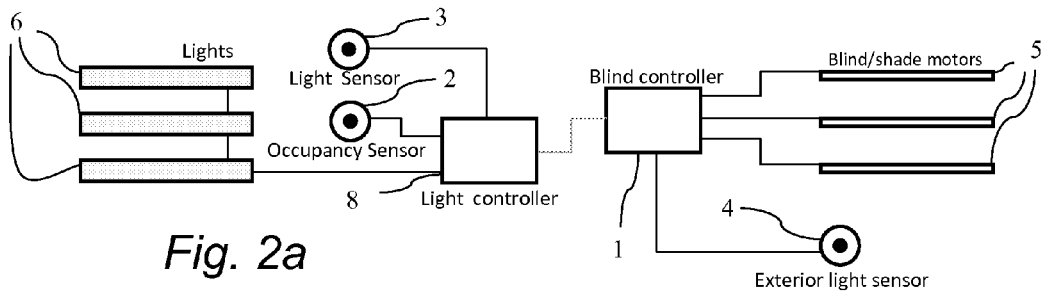
FIGS. 2a to 2d show the control system for automatic calibration of a blinds system, with different configurations of control hardware.
Figure 2B:
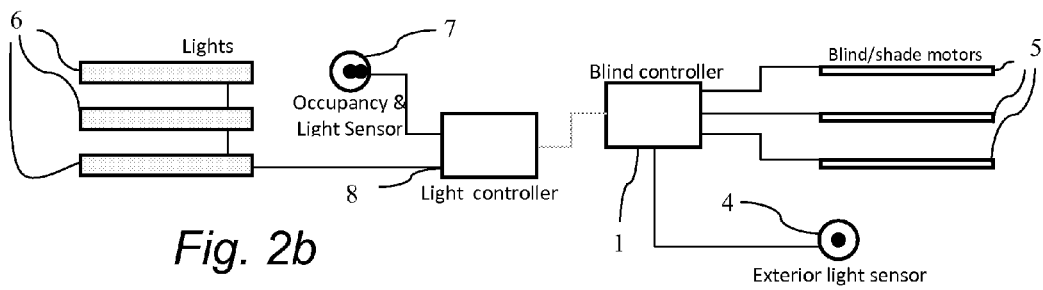
Figure 2C:
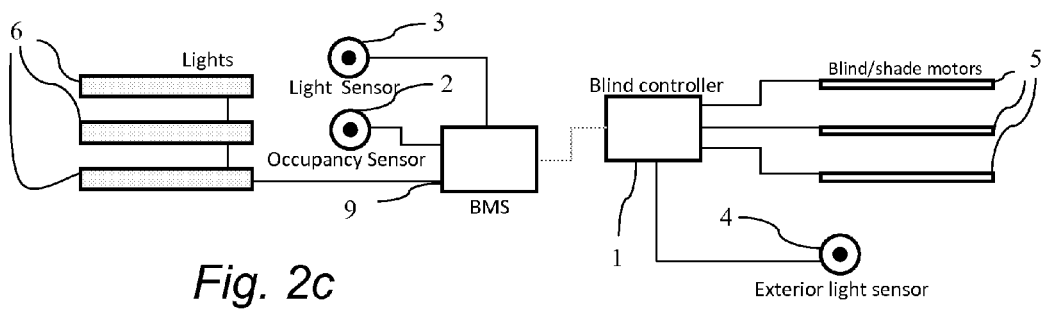

In case of a more advanced lighting system the occupancy information can be shared via a central lighting controller, or as part of a building management system (BMS) 9 as shown in FIG. 2a. In this case, existing network infrastructure (like LON or KNX, or IP) can be leveraged, but a proprietary protocol between the lighting and blinds system can also be used. In any case, specific commands and information will need to be exchanged between the blinds system controller 1 and the BMS 9.

Figure 4:
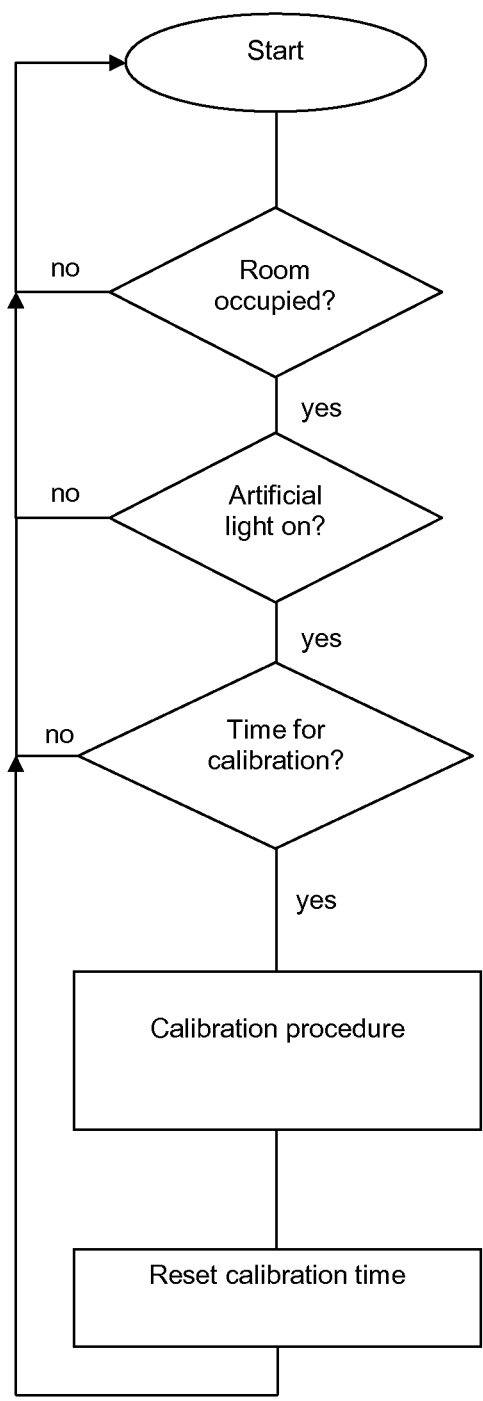
FIG. 4 is a flow chart of the principle of when to perform automatic calibration of the blinds.
Figure 5:
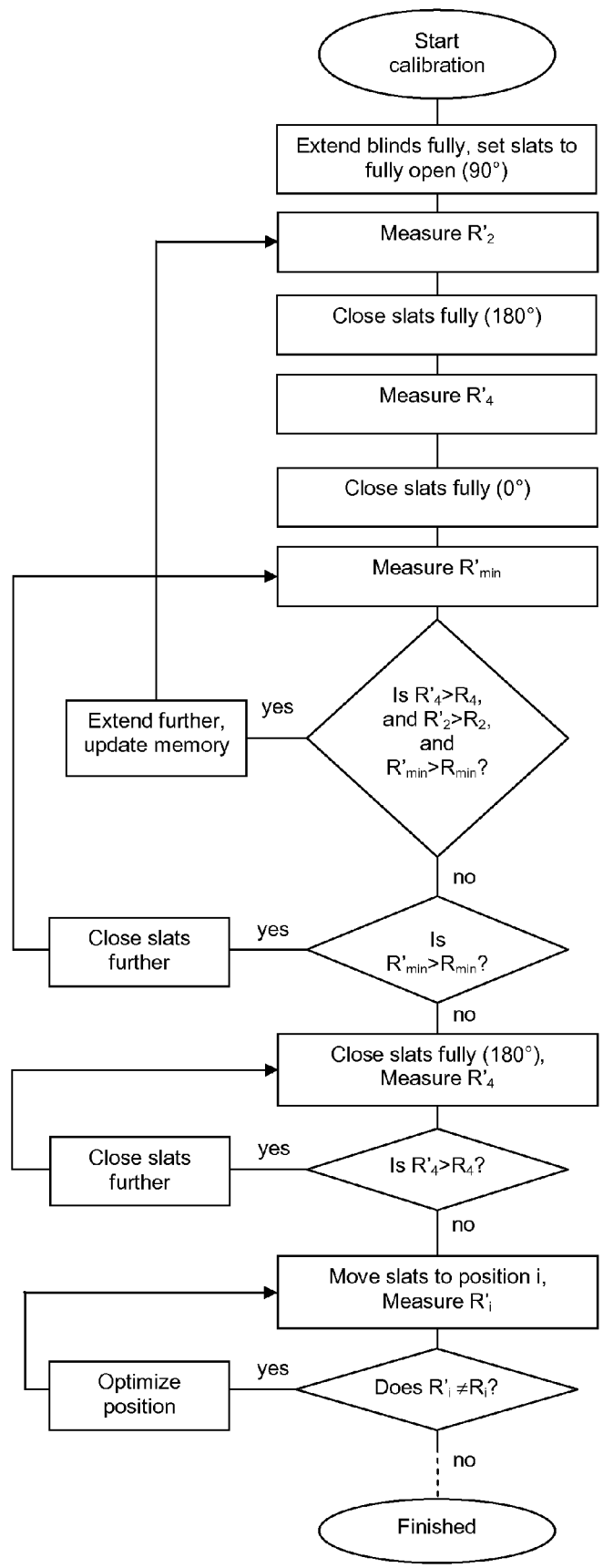
FIG. 5 is a flow chart of one example of the calibration procedure.

When people are present, the blinds and lights will work normally, but when the occupancy sensor (2, 7) triggers a change in occupancy (no occupancy, so no people are present) the blinds system can decide to recalibrate itself. The decision to recalibrate is based on the time since the last recalibration, see example in FIG. 4, and should be in line with known mechanical wear data of the various components in the blinds system.

(Re)calibration is only possible during the day and when the interior lights are off. (Re)calibration can further only be done sensibly if the calibration results can be compared to previous results. It is therefore important to do the calibration sequence right after first installation to provide light level values to compare to in coming calibrations.

Figure 3A:
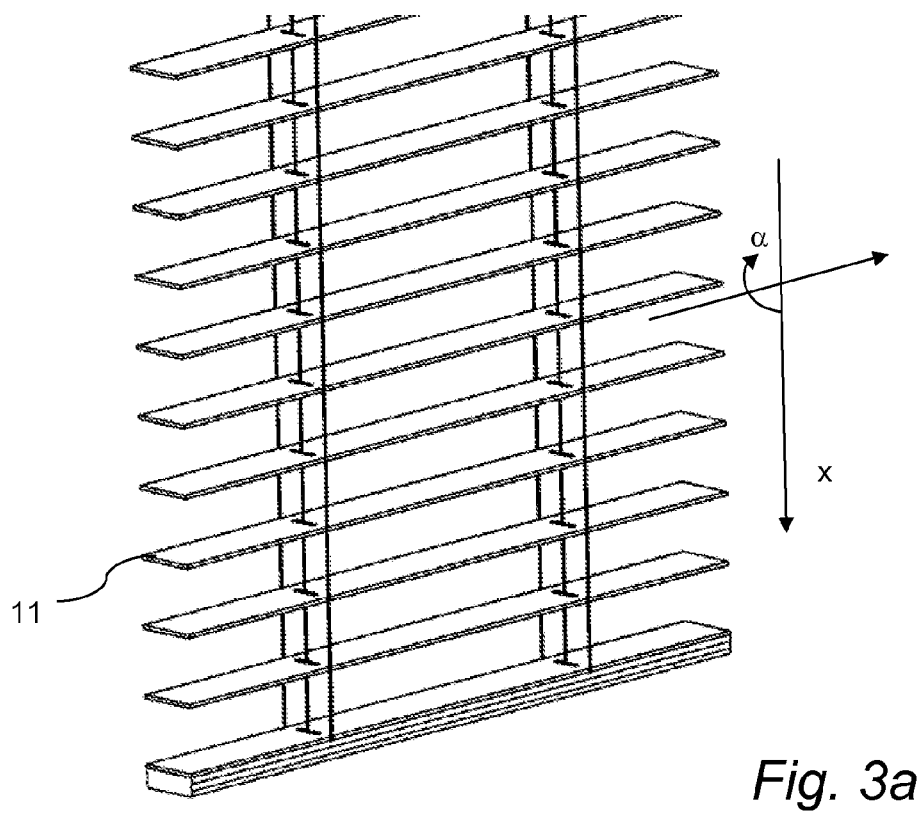
FIGS. 3a to 3b show examples of venetian blinds having open slats (FIG. 3a), and closed slats (FIG. 3b).
Figure 3B:
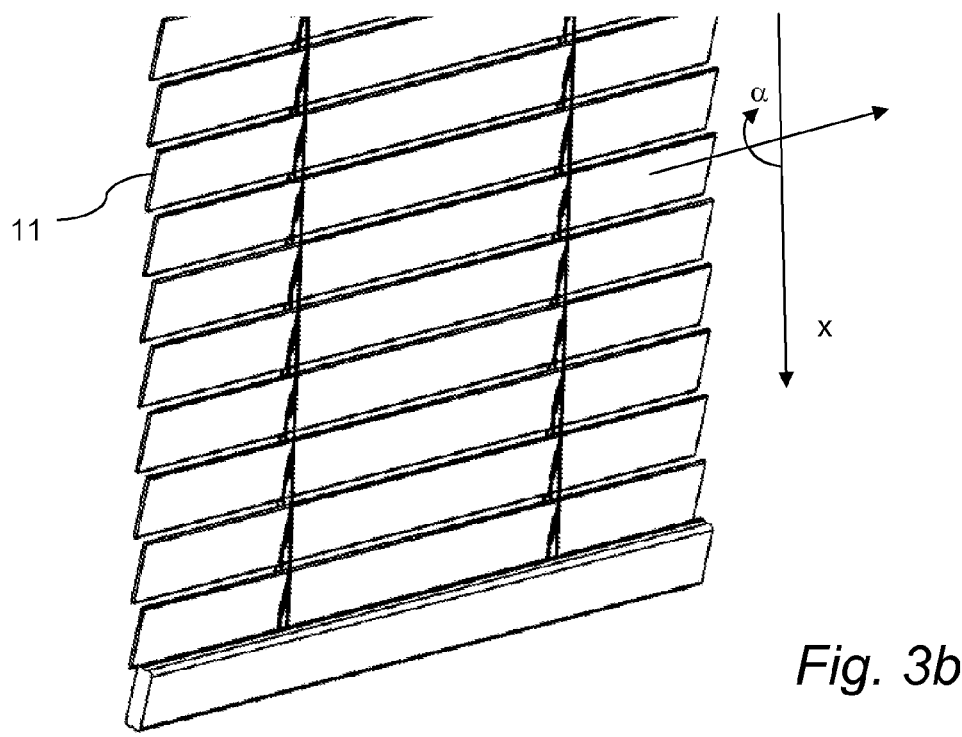

The calibration procedure will now be discussed with reference to FIG. 3a, FIG. 3b, FIG. 4, and FIG. 5. FIG. 3a shows an example of venetian blinds where they are fully extended and the slats 11 are fully open, or at an angle α equal to 90 degrees. The same blinds having the slats in a closed position, or at an angle α equal to 0 degrees, is shown in FIG. 3b. The angle is relative to the vertical axis x.

The (re)calibration sequence is done by adjusting the blinds and slat positions while measuring exterior and interior light intensity, or more specifically the ratio between interior light intensity and exterior light intensity. The light level ratio R, is defined as $R=L_i/L_e$, in which $L_i$ is the interior light intensity, usually measured horizontally, e.g. on a table surface, and $L_e$ is the exterior light intensity usually measured vertically, e.g. at the building exterior facade surface.

The blinds fully open position, i.e. when the blinds are not extended at all, is when the ratio between interior light condition and exterior light conditions should be maximum, $R_{max}$. When the blinds are fully down and the slats are closed fully α is equal to 0 degrees, the ratio between interior light condition and exterior light conditions should be at its minimum, $R_{min}$. Various positions of the slats can be measured, but some are important to calibrate since they affect the other calibration positions. The most important positions are $R_{max}$, discussed above, and $R_2$ and $R_4$, listed below. It is preferable that also $R_1$ and $R_3$, below, are measured and adjusted during calibration.

The blinds are fully down with the slats at α is equal to 45 degrees; $R_1$

The blinds are fully down but open α is equal to 90 degrees; $R_2$

The blinds are fully down with the slats at α is equal to 135 degrees; $R_3$

The blinds are fully down and closed at α is equal to 180 degrees; $R_4$, which should be about the same as $R_{min}$ By comparing the ratio values R with previously measured ratio values R' the blinds system can be recalibrated. For instance, if $R_{max}$ is lower than normal, the blinds are not fully opened. The system can raise the blinds further with a certain incremental step, actually rotating the motor further than the 'fully up' value, and measure $R_{max}$ again. This step is repeated until $R_{max}$ reaches a value in line with earlier measurements: the new motor axis angle is stored as new 'fully up' value.

If $R_{min}$ is higher than normal, the blinds are not fully closed. But this can imply that either the slats need to be closed further or that the blinds can be lowered more. Hence the values of $R_4$ and $R_2$ should be considered as well. If both $R_4$ and $R_2$ or also higher than normal, the blinds need to be lowered. The system can lower the blinds further with a certain incremental step, actually rotating the motor further than the 'fully down' value and measure $R_{min}$, $R_2$ and $R_4$ again. This step is repeated until $R_{min}$ reaches a value in line with earlier measurements: the new motor axis angle is stored as new 'fully down' value.

If $R_{min}$ is higher than normal and $R_4$ and/or $R_2$ is at a normal level, the slat positions need to be calibrated. This can be double checked by measuring $R_1$ which should also be slightly higher than normal. The system can increase the maximum angle by rotating the slats further, increasing the angle, with a certain incremental step and measuring $R_{min}$ and $R_2$ and $R_1$ again. This step is repeated until $R_{min}$ reaches a value in line with earlier measurements: the maximum slat angle found is stored as the new 'maximum angle' value. $R_4$ needs to be calibrated similarly to $R_{min}$. $R_1$ and $R_3$ have to be adjusted only by comparing previous $R_1$ and $R_3$ measures.

In order to further fine-tune calibration it is preferred to measure the R values when the blinds and slat positions are accomplished from different extreme positions. The reason for this is that mechanical behaviour can differ over time, between blinds but also from one extreme position to the other (in other words: blinds often show non-symmetrical mechanical behaviour and wear).

When measuring $R_{min}$ the blinds should go to full down first every time. When measuring $R_{max}$ two measurements have to be made. (I) the blinds should first go to fully up and then to fully down with slats closed and (II) the slats should go to maximum angle, $\alpha$ is equal to 180 degrees, first and then to closed at $\alpha$ is equal to 0 degrees, i.e. minimum angle. When measuring $R_1$ two measurements have to be made. (I) the blinds should go to fully up first and then to fully down with slats closed at $\alpha$ is equal to 180 degrees and (II) the slats should go to minimum angle, $\alpha$ is equal to 0 degrees, first and then to closed at 180 degrees (maximum angle).

When measuring $R_2$, $R_3$, and $R_4$ two measurements have to be made: (I) the blinds should go to maximum angle, $\alpha$ is equal 180 degrees, and then to the required angle and (II) the slats should go to minimum angle $\alpha$ is equal to 0 degrees, first and then to the required angle.

As direct sunlight can have considerable impact on the measured R values it is highly recommended to only calibrate when there is no direct sunlight and only indirect daylight.

However, as this would reduce the opportunity to calibrate the system, the sunlight position can be taken into account when doing the measurements and comparing to earlier measurements. In this case the R values need to be normalised by subtracting the impact of direct sunlight. For instance if the sunlight is blocked by the blinds the R value is much lower than the same R value with only indirect daylight. The angle of the sun compared to the angle of the blinds determines if the sun is blocked or not and to what extent. If this is known, the sunlight intensity can be subtracted from the external light intensity when calculating the R value: $R_{norm}$ is equal to $L_i/(L_e-L_s*f)$ where $L_s$ is the sunlight intensity and f the fraction of direct sunlight that is blocked by the blinds. It should be clear that this requires independent sun and daylight sensors as well as models on how blinds and sunlight interact in order to be able to calculate f.

It is understood that vertical blinds can be calibrated similarly, if not even completely equivalent, as venetian blinds.

Other, simpler window coverings are easier to calibrate as these only can be opened or closed. It is in those cases recommended to also have intermediate measurements. At least one, being halfway closed.

If a person walks into the office while the system is calibrating, the calibration sequence should stop immediately, and if the light levels are still adequate, continue at another moment when no one is present.

Regarding the communication protocol it is clear that the lighting system should share occupancy information with the blinds system, or better changes in occupancy state. Possibly with a certain delay to assure that people are not be annoyed by the system going into calibration if they only were not detected by the sensor for a brief moment. This allows the blinds system to go into calibration sequence. It is also clear that the blinds system should be able to request all interior lights to be switched off, if not done already automatically by the lighting system, and to be able to request interior light intensity from the lighting system. The lighting system should be able to provide this value to the blinds system subsequently.

The daylight and sunlight sensors are normally part of the blinds system.

Figure 2D:
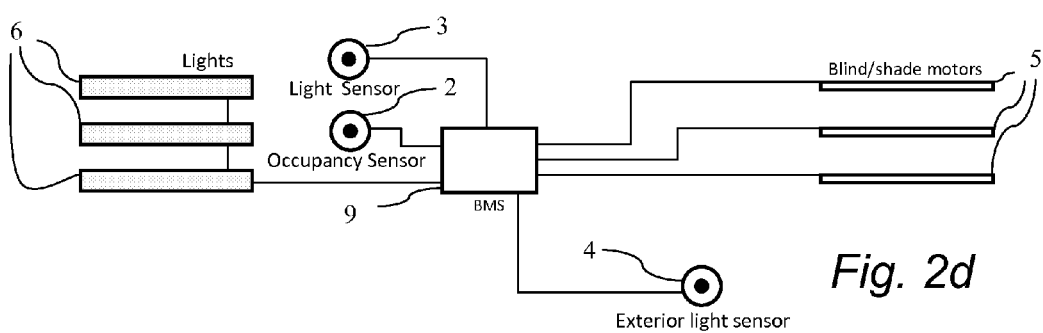

In case of integration in a building management systems (BMS), or something similar, all sensor data should be available to the building management system directly and in this case the BMS should be able to control the blinds and light to calibrate or provide the required information to the blinds system to calibrate, as shown in FIG. 2d.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. Control system for automatic calibration of a blinds system installed in a room, comprising:
   a controller having a memory, a clock and a processor,
   an occupancy sensor,
   an interior light sensor,
   an exterior light sensor,
   wherein the control system is arranged to run an automated calibration of the blinds system when the exterior light sensor indicates an outside light level above a predetermined threshold, the occupancy sensor indicates that no person is present in the room, and a predetermined time has passed since the last calibration.

2. Control system claim 1, further comprising an artificial lighting detector for determining if artificial lighting is on in the room, and wherein the control system is arranged to run a calibration of the blinds system when the artificial lighting detector indicates that artificial lighting is off.

3. Control system according to claim 1, wherein the blinds system comprises slats, a first step motor arranged to drive extension movements of the blinds and a second step motor arranged to drive rotational movement of the slats, wherein the memory has a number of stored positions of the first and second step motors and wherein the corresponding light level ratio between interior and exterior light is stored for each of the stored positions and wherein the stored step motor positions are arranged to be updated to meet the light level ratio during the automatic calibration.

4. Control system according to claim 1, further comprising network communications means.

5. Control system according to claim 1, wherein the occupancy sensor and/or interior light sensor are part of a lighting system in a room having the control system for auto-calibration of blinds systems installed, the network communication means being arranged to communicate with the occupancy sensor and/or interior light sensor.

6. Building comprising a control system according to claim 1.

7. Method for automatic calibration of a blinds system installed in a room using a control system comprising a controller having a memory, a clock and a processor, an occupancy sensor, an interior light sensor, an exterior light sensor, wherein the method comprises the step of running an automated calibration of the blinds system when the exterior light sensor indicates an outside light level above a predetermined threshold, the occupancy sensor indicates that no person is present in the room, and a predetermined time has passed since the last calibration.

8. Method according to claim 7, wherein the control system further comprises an artificial lighting detector for determining if artificial lighting is on in the room, wherein the method further comprises the step of running the calibration of the blinds system when the artificial lighting detector indicates that artificial lighting is off.

9. Method according to claim 7, wherein the blinds system comprises slats, a first step motor arranged to drive extension movements of the blinds and a second step motor arranged to drive rotational movement of the slats, wherein the memory has a number of stored positions of the first and second step motors and wherein the corresponding light level ratio between interior and exterior light is stored for each of the stored positions, and wherein the method further comprises the step of updating the stored step motor positions to meet the light level ratio during the automatic calibration.

10. Method according to claim 9, wherein the step of updating the stored step motor positions comprises the steps of:
controlling the first and second step motor to a stored position for the blinds with regard to blinds extension and slat angles ($\alpha$), the slat angle being relative to the vertical axis (x),
measuring a new light level ratio between interior and exterior light,
comparing the new light level ratio to the stored light level ratio for the current position,
wherein, if the new light level ratio is other than the stored light level ratio, the second step motor is incrementally adjusted while measuring the light level ratio to find the predetermined light level ratio, which measured light level ratio is updated in the memory together with the step motor positions for the blinds position.

11. Method according to claim 10, wherein the stored positions of the first and second step motors correspond to at least one of the following combinations for light level ratios R:
$R_1$) the blinds are fully extended with the slats at $\alpha$ equal to 45 degrees;
$R_2$) the blinds are fully extended with the slats fully open or at $\alpha$ equal to 90 degrees;
$R_3$) the blinds are fully extended with the slats at $\alpha$ equal to 135 degrees;
$R_4$) the blinds are fully extended with the slats fully closed or at $\alpha$ equal to 180 degrees;
$R_{min}$) the blinds are fully extended with the slats fully closed or at $\alpha$ equal to 0 degrees; or
$R_{max}$) the blinds are not extended, the slats are fully open or at $\alpha$ equal to 90 degrees.

12. Method according to claim 11, wherein the step of updating the stored step motor positions comprises the steps of:
controlling the first and second step motor to the stored position for light level ratio $R_2$
measuring the light level ratio $R'_2$,
controlling the first and second step motor to the stored position for light level ratio $R_4$
measuring the light level ratio $R'_4$,
controlling the first and second step motor to the stored position for light level ratio $R_{min}$
measuring the light level ratio $R'_{min}$,
comparing the measured light level ratio $R'_{min}$ to the stored light level ratio $R_{min}$ for the current position, and
if the measured light level ratio $R'_{min}$ is higher than the stored light level ratio $R_{min}$, $R'_4$ is higher than $R_4$, and $R'_2$ is higher than $R_2$, the first step motor is incrementally adjusted to further extend the blinds until $R_{min}$ is equal or lower than the stored value,
update the last measured light level ratio is in the memory together with the step motor positions for the fully extended and fully closed position.

13. Method according to claim 12, wherein if the measured light level ratio $R_{min}'$ is higher than the stored light level ratio $R_{min}$, and $R'_4$ and $R'_2$ both are as the stored values $R_4$ and $R_2$ respectively, the second step motor is incrementally adjusted to further close the slats while measuring the light level ratio until the light level ratio is equal to or lower than the stored value, and update the last measured light level ratio in the memory together with the step motor positions for the fully extended and fully closed position.

14. Method according to claim 11, wherein the step of updating the stored step motor positions further comprises the steps of:
controlling the first and second step motors (5) to the stored position for light level ratio $R_2$
measuring a new light level ratio $R'_2$ between interior and exterior light,
comparing the new light level ratio $R'_2$ to the stored light level ratio for the current position,
wherein, if the new light level ratio $R_2'$ is lower than the stored light level ratio $R_2$, the second step motor is incrementally adjusted while measuring the light level ratio to find the maximum light level ratio, which maximum light level ratio is updated in the memory together with the step motor positions for the fully extended and fully opened position.

15. Control system for automatic calibration of a blinds system installed in a room, comprising:
a controller having a memory, a clock and a processor,
an occupancy sensor,
an interior light sensor,
an exterior light sensor,
wherein the control system is arranged to run an automated calibration of the blinds system to compensate for wear of the hardware components of the blinds system, wherein the automatic calibration occurs when the exterior light sensor indicates an outside light level above a predetermined threshold, the occupancy sensor indicates that no person is present in the room, and a predetermined time has passed since the last calibration.

* * * * *